US008912437B2

(12) United States Patent
Teng

(10) Patent No.: US 8,912,437 B2
(45) Date of Patent: Dec. 16, 2014

(54) SUSPENSION INSULATOR AND SUSPENSION INSULATOR GROUP

(75) Inventor: Guoli Teng, Shandong (CN)

(73) Assignees: Zibo Taiguang Electric Power Equipment Factory, Shandong (CN); State Grid Corporation of China, Beijing (CN)

( * ) Notice: Subject to any disclaimer, the term of this patent is extended or adjusted under 35 U.S.C. 154(b) by 249 days.

(21) Appl. No.: 13/391,330

(22) PCT Filed: Aug. 19, 2010

(86) PCT No.: PCT/CN2010/001259
§ 371 (c)(1), (2), (4) Date: May 7, 2012

(87) PCT Pub. No.: WO2011/020304
PCT Pub. Date: Feb. 24, 2011

(65) Prior Publication Data

US 2012/0217052 A1 Aug. 30, 2012

(30) Foreign Application Priority Data

Aug. 21, 2009 (CN) .......................... 2009 1 0168508
Aug. 21, 2009 (CN) ...................... 2009 2 0174104 U

(51) Int. Cl.
*H02G 7/05* (2006.01)
*H01B 17/00* (2006.01)
*H01B 17/04* (2006.01)
*H01B 17/32* (2006.01)

(52) U.S. Cl.
CPC .............. *H01B 17/04* (2013.01); *H01B 17/325* (2013.01)
USPC ....... 174/40 R; 174/137 R; 174/209; 174/142

(58) Field of Classification Search
USPC .......... 174/40 R, 42, 209, 137 R, 141 R, 182, 174/142, 148, 152 R, 153 G, 144, 140 R, 174/139; 16/2.1, 2.2
See application file for complete search history.

(56) References Cited

U.S. PATENT DOCUMENTS 1,691,330 A * 11/1928 Austin .......................... 174/139
1,725,097 A * 8/1929 Naylor .......................... 174/209
1,880,259 A * 10/1932 Knapp ...................... 174/141 R
3,848,076 A * 11/1974 Greber .......................... 174/209
4,001,491 A * 1/1977 Bauer ........................... 174/209
4,107,455 A * 8/1978 Richards ................... 174/140 R

FOREIGN PATENT DOCUMENTS

CN 2348471 Y † 11/1999
CN 201489923 U † 5/2010

* cited by examiner
† cited by third party

*Primary Examiner* — Angel R Estrada
(74) *Attorney, Agent, or Firm* — The Webb Law Firm

(57) ABSTRACT

The present disclosure discloses a suspension insulator and a suspension insulator group. The suspension insulator comprises a silicone rubber umbrella string and a fiber-reinforced resin-based composite rod, wherein the silicone rubber umbrella string is arranged on the fiber-reinforced resin-based composite rod. Since the umbrella string is made of silicone rubber and is arranged on the fiber-reinforced resin-based composite rod, as compared with porcelain suspension insulator or glass suspension insulator, it has a low density and a light weight, and may reduce the load of the tower and is convenient to install and remove. The suspension insulator provided by the present disclosure is especially applicable to the field of power transmission.

18 Claims, 5 Drawing Sheets

SUSPENSION INSULATOR AND SUSPENSION INSULATOR GROUP

TECHNICAL FIELD

The present disclosure relates to a suspension insulator and a suspension insulator group, which belong to the field of power transmission.

BACKGROUND ART

Power grids have developed rapidly around the world with the development of economy. There has been an increasing demand for various components used in the power grids, and insulators are among the rest. Insulators are used to support transmission lines, and may ensure sufficient insulation between the transmission lines and the crossarm and the tower. In operation, the insulators should be capable of withstanding the vertical load and the horizontal tension of the transmission lines. The insulators are also exposed to the sun and rain, and are subject to the change of weather and corrosion of chemicals. Therefore, the insulators are required to have both excellent electrical performances and sufficient mechanical strength. The quality of insulators is critical to the safe operation of the transmission lines.

Insulators can be classified by structure as supporting insulator, suspension insulator, anti-pollution insulator and bushing insulator. Commonly used in overhead lines are pin insulator, shackle insulator, suspension insulator, porcelain crossarm, rod insulator, strain insulator, etc. Electrical faults of insulators include flashover and breakdown. Flashover occurs in the surface of the insulator, with visible burn marks but normally without damaging the insulation; breakdown occurs in the interior of the insulator by discharging through the porcelain between an insulator cap and an insulator pin, possibly damaging the insulation but without any marks in the appearance, and also possibly destroying the insulator completely due to an electric arc. For breakdown, the insulator pin should be examined for the discharging mark and the burn mark.

Currently, disk-type multi-piece suspension insulators are often used, as shown in FIG. 1. FIG. 2 illustrates one single piece of FIG. 1. As shown in FIG. 2, the single piece comprises a socket 1, an umbrella 11 and a head 9. A plurality of (e.g., n in FIG. 1) single-pieces are connected in series to form the structure in FIG. 1. Conventional suspension insulators are made of porcelain or glass, and especially, porcelain insulators have existed for more than 100 years. However, porcelain or glass has a high density, which imposes a heavy load to the tower.

SUMMARY OF INVENTION

The present disclosure provides a suspension insulator with a light weight, which may reduce the load of the tower and is easy to install and remove.

The present disclosure provides a suspension insulator, which may comprise a silicone rubber umbrella string and a fiber-reinforced resin-based composite rod, wherein the silicone rubber umbrella string is arranged on the fiber-reinforced resin-based composite rod.

Preferably, the fiber-reinforced resin-based composite rod may include a core layer and an outer layer, wherein the core layer may be made of a fiber-reinforced resin-based composite, and the outer layer may be made of silicone rubber.

Preferably, the host silicone material used for preparing the silicone material is one selected from the following materials: methyl vinyl silicone rubber, dimethyl silicone rubber, methyl phenyl vinyl silicone rubber, fluorocarbon silicone rubber, nitrile silicone rubber, phenylene and phenylene oxide silicone rubber.

Preferably, the fiber may be one selected from the following materials: glass fibers, organic polyamide fibers, aramid fibers and carbon fibers.

Preferably, the resin may be one selected from the following materials: epoxy resin, unsaturated polyester resin and toughened epoxy resin.

Preferably, the fiber-reinforced resin-based composite may be glass fiber-reinforced epoxy resin-based composite.

Preferably, the materials for preparing the silicone rubber may comprise: methyl vinyl silicone rubber, white carbon black, aluminum hydroxide micropowder and iron oxide red in weight percents of 43%, 20%, 30% and 7% respectively.

Preferably, the methyl vinyl silicone rubber has a molecular weight of $3\text{–}7\times10^5$.

Preferably, the silicone rubber umbrella string comprises big umbrellas and small umbrellas.

Preferably, the big umbrellas and the small umbrellas have an umbrella center of a larger size than an umbrella edge.

Preferably, the big umbrellas and the small umbrellas are arranged in series.

Preferably, the big umbrellas and the small umbrellas are arranged in series regularly.

Preferably, two big umbrellas and two small umbrellas are arranged alternately in series, or one big umbrella and two small umbrellas are arranged alternately in series.

Preferably, the suspension insulator further comprises an upper grading ring and a lower grading ring, wherein one side of the upper grading ring and one side of the lower grading ring are connected to the ends of the silicone rubber umbrella string, respectively.

Preferably, the suspension insulator further comprises a head and a socket, the other side of one of the upper grading ring and the lower grading ring is connected to the head, while the other side of the other of the upper grading ring and the lower grading ring is connected to the socket.

Preferably, the suspension insulator further comprises a fastening pin, the fastening pin is placed in the socket to fasten the connection between the head and the socket.

Preferably, the upper grading ring and the lower grading ring have a shape of a circular ring.

Preferably, the upper grading ring and the lower grading ring have a diameter of 1 meter or above.

Preferably, the silicone rubber umbrella string has a length of 4 meters or above.

The present disclosure also provides a suspension insulator group, comprising two or more of any above suspension insulators connected in series.

With the suspension insulator provided by the present disclosure, since the umbrella string is made of silicone rubber and is arranged on the fiber-reinforced resin-based composite rod, as compared with porcelain suspension insulator or glass suspension insulator, it has a low density and a light weight, and may reduce the load of the tower and is convenient to install and remove.

The suspension insulator provided by the present disclosure is especially applicable to the field of power transmission.

The reference numbers are:

1—socket, 2—fastening pin, 3—sealing ring, 4—upper grading ring, 5—sheathing rod, 6—big umbrella, 7—small umbrella, 8—lower grading ring, 9—head, 10—fiber-reinforced resin-based composite rod, 101—core layer, 102—outer layer, 11—umbrella, 12—umbrella string.

EMBODIMENTS

The embodiments will be explained below to facilitate those skilled in the art to better understand the technical solution of the present disclosure.

Embodiment 1

Firstly, the structure of the suspension insulator provided by this embodiment will be explained Referring to FIG. 3, in which the unit is mm.

Figure 5:
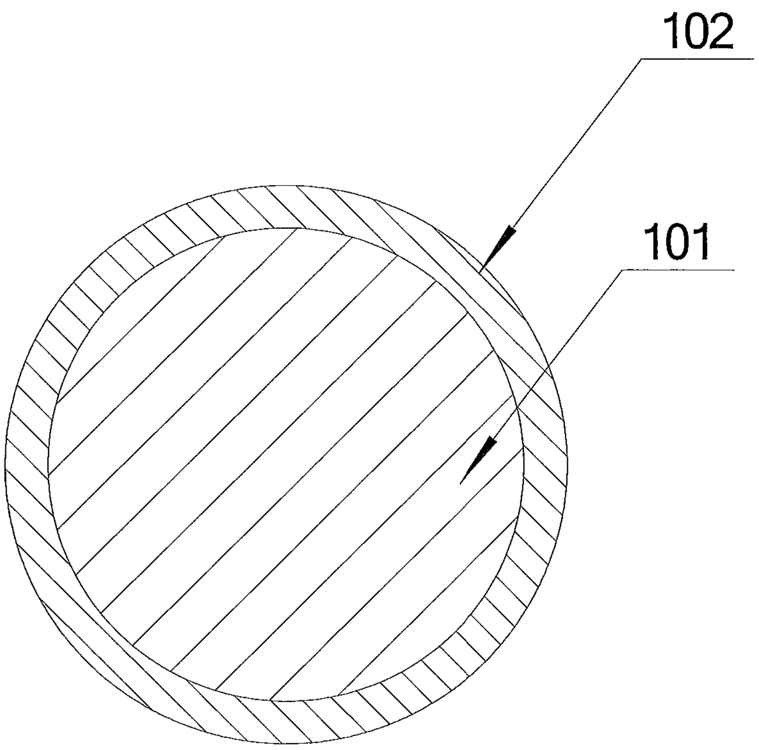
FIG. 5 illustrates the sectional view of the fiber-reinforced resin-based composite rod of the suspension insulator.

The suspension insulator provided by this embodiment may comprise a silicone rubber umbrella string 12 and a fiber-reinforced resin-based composite rod 10, wherein the silicone rubber umbrella string 12 is arranged on the fiber-reinforced resin-based composite rod 10. Optionally, other materials can be used for the rod. As shown in FIG. 5, the fiber-reinforced resin-based composite rod 10 comprises a core layer 101 and an outer layer 102, the core layer 101 may preferably be made of a fiber-reinforced resin-based composite, and the outer layer 102 may preferably be made of silicone rubber.

The silicone rubber umbrella string 12 consists of a plurality of big umbrellas 6 and a plurality of small umbrellas 7, and the big umbrellas 6 and the small umbrellas 7 are arranged in series. Optionally, the suspension insulator may also comprise an upper grading ring 4 and a lower grading ring 8, one side of the upper grading ring 4 and one side of the lower grading ring 8 are connected to the ends of the umbrella string 12, respectively. Also, the suspension insulator may also comprise a head 9 and a socket 1, the other side of one of the upper grading ring 4 and the lower grading ring 8 may be connected to the head 9, and the other side of the other of the upper grading ring 4 and the lower grading ring 8 is connected to the socket 1. Optionally, the suspension insulator may also comprise a fastening pin 2, which can be placed in the socket to fasten the connection between the head and the socket. In this embodiment, the lower grading ring 8 is connected to the head 9, the upper grading ring 4 is connected to the socket 1, and the fastening pin 2 is placed in the socket 1. When suspending the insulator, the fastening pin 2 is firstly pulled to a preinstall position, then a head on the tower is engaged into the socket 1 of the suspension insulator, and then the fastening pin 2 is set to an operation position, to fasten the head on the tower and the socket 1 of the suspension insulator, so that the suspension insulator can be suspended on the tower.

Figure 1:
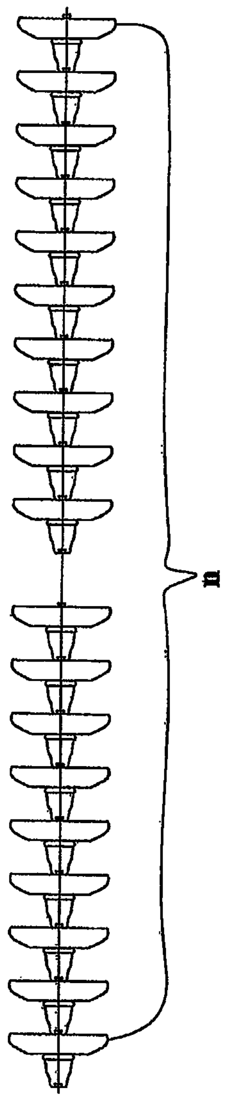
FIG.1 Prior Art
FIG. 1 illustrates a disk-type multi-piece suspension insulator in the prior art.
Figure 2:
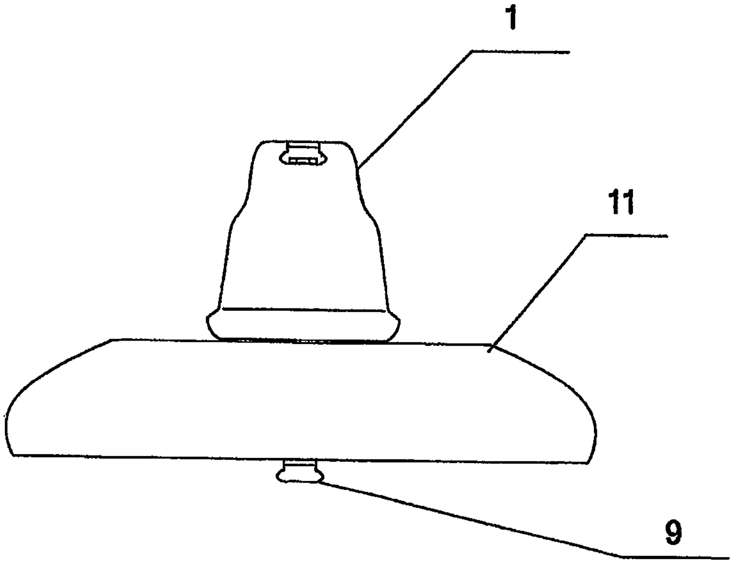
FIG.2 Prior Art
FIG. 2 illustrates a single-piece shown in FIG. 1.
Figure 3:
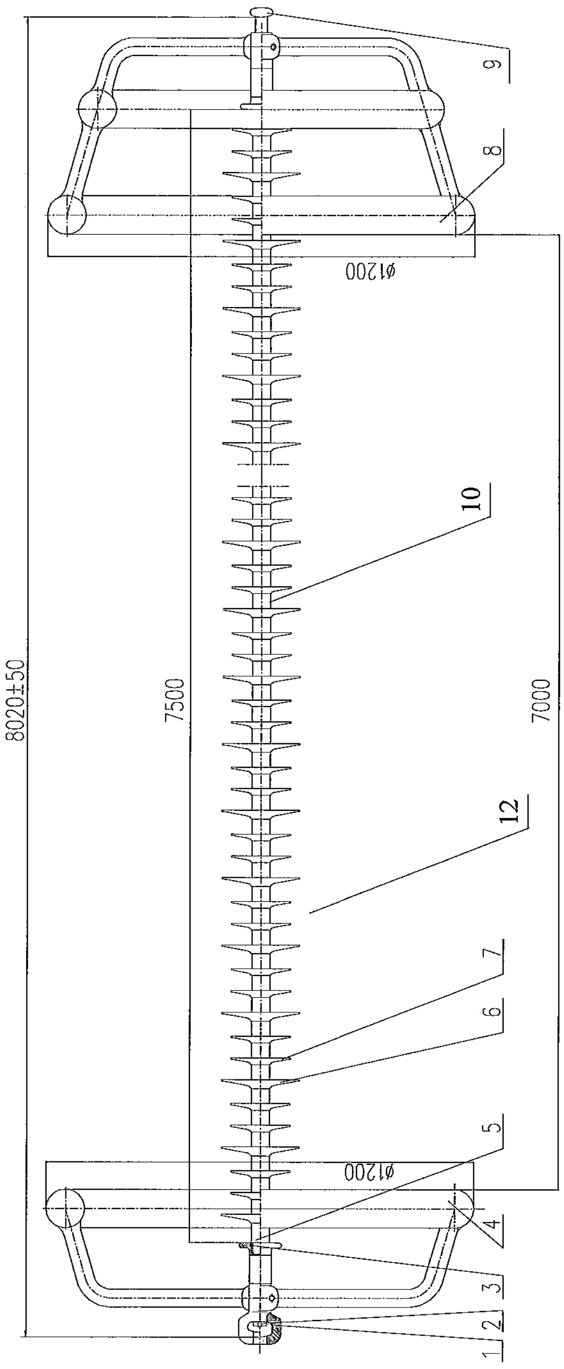
FIG. 3 illustrates the suspension insulator provided by Embodiment 1.

As can be seen from FIG. 3, one big umbrella 6 and two small umbrellas 7 in the silicone rubber umbrella string 12 are arranged alternately in series. The big umbrellas 6 and the small umbrellas 7 have similar structures, in which the size of the umbrella center is large and the size of the umbrella edge is small, that is to say, the umbrella center is thick and the umbrella edge is thin. When the umbrella edge is subject to a force, a smaller force is transmitted to the umbrella center, thus improving the stress condition of the umbrella.

The length of the silicone rubber umbrella string refers to the distance from the first big umbrella or small umbrella to the last big umbrella or small umbrella, that is, as can be seen from FIG. 3, the distance from the left-most big umbrella to the right-most small umbrella. When measuring the length of the silicone rubber umbrella string, there may exist an error which can generally be permitted within 20 mm. The length of the silicone rubber umbrella string can be 4 meters or above, which provides an advantage of the length of the entire insulator and is equivalent to a plurality of existing porcelain insulators or glass insulators. In this embodiment, the silicone rubber umbrella string has a length of 7.5 m.

The upper grading ring 4 and the lower grading ring 8 have a shape of a circular ring and the section is bow-like, which may protect the silicone rubber umbrella string therein. In addition, the grading ring having a shape of a circular ring may reduce the field strength of the end portion. The diameters of the upper and lower grading rings may depend on the dimensions of the silicone rubber umbrella string, as long as the silicone rubber umbrella string can be protected. Normally, the upper and lower grading rings may have a diameter of 1 meter or above, and in this embodiment, the upper and lower grading rings have a diameter of 1.2 m.

Next, the materials for the suspension insulator provided by the this embodiment will be described.

Silicone rubber used herein is a silicone rubber composite formed by hot pressing a host silicone material as the main material to which various auxiliary agents including vulcanizing agent, reinforcing agent and the like are added.

The host silicone material of the silicone rubber used in the examples may be methyl vinyl silicone rubber, which has a chain spiral silicone molecular structure formed by high-temperature ring-opening and polymerizing of octamethylcyclotetrasiloxane (abbreviated as D4), then adding vinyl groups and an end capping agent, and which generally has a molecular weight of $3\text{-}7\times10^5$.

A process for preparing the silicone rubber may comprise the following two steps:

a) weighing various materials including the host silicone material and the like in ratios; kneading methyl vinyl silicone rubber, white carbon black, and aluminum hydroxide micropowder in a kneader for 40-60 minutes; adding iron oxide red and other materials such as methyl silicone oil and hydroxyl silicone oil, and kneading for about 40 minutes until resulting in a fine and homogeneous rubber stock, wherein the weight ratios of methyl vinyl silicone rubber, white carbon black, aluminum hydroxide micropowder and iron oxide red are respectively of 43%, 20%, 30% and 7%; then, thin-passing the rubber stock through an open mill, and compounding; hot milling in a heated kneader; finally, kneading in a pressurized kneader with the addition of a vulcanizing agent, to form a rubber mix; and b) vulcanizing the rubber mix in a die under the conditions of high temperature and high pressure.

The silicone rubber prepared by the above process generally comprises methyl vinyl silicone rubber, white carbon black, aluminum hydroxide micropowder, methyl silicone oil, hydroxyl silicone oil, iron oxide red, peroxide and yellow lead oxide.

The silicone rubber prepared by the above process, due to the chain spiral silicone molecular structure of methyl vinyl silicone rubber forms a stable stereo network silicone molecular structure, has excellent hydrophobicity and migration of hydrophobicity, and various electrical properties and anti-ageing property.

In addition, the host silicone material used in the examples may also be one selected from, but not limited to, the following materials: dimethyl silicone rubber (abbreviated as methyl silicone rubber), methyl phenyl vinyl silicone rubber (abbreviated as phenyl silicone rubber), fluorocarbon silicone rubber, nitrile silicone rubber, phenylene and phenylene oxide silicone rubber and the like.

In the embodiment, the fiber-reinforced resin-based composite may be selected from glass fiber-reinforced epoxy resin-based composite. In addition, the fiber may be one selected from, but not limited to, the following materials: glass fibers, organic polyimide fibers, aramid fibers and carbon fibers. Among them, glass fibers and aramid fibers have good insulation property, one of which is preferably used. Besides, glass fiber is cheaper than aramid fiber, so glass fiber is preferably used as the reinforcing material. The resin may be one selected from, but not limited to, the following materials: epoxy resin, unsaturated polyester resin and toughened epoxy resin. Epoxy resin or unsaturated polyester resin is preferably used. In consideration of toughness, toughened epoxy resin is preferably used, because it has not only strength property, but also excellent impact property. The umbrella string as shown in this embodiment can not only be strung by the glass fiber-reinforced epoxy resin-based composite rod, but can also be made in other forms, as long as a silicone rubber umbrella string can be made.

As compared with a rod made solely of silicone rubber, the glass fiber-reinforced resin-based composite rod of this embodiment, which has adopted a composite structure of a core layer and an outer layer, may on the one hand reduce the costs since a rod made solely of silicone rubber requires high costs, and may on the other hand achieve a good engagement, wherein the glass fiber-reinforced resin-based composite core layer provides mechanical property and the silicone rubber outer layer provides anti-pollution flashover and anti-fog flashover properties.

In this embodiment, the silicone rubber umbrella string 12 can be arranged on the fiber-reinforced resin-based composite rod, and an upper grading ring 4 and a lower grading ring 8 may be combined with the umbrella string 12 to form a complete insulator (i.e., an integral structure), thus obtaining an integral insulator. Generally, an integral suspension insulator may have a height of 4 meters or above, which is equivalent to a porcelain insulator or glass insulator with more than 40 pieces. With equivalent quality, a fault may only occur at the ends of the silicone rubber umbrella string, while the porcelain insulator or glass insulator with more than 40 pieces have more joints. Therefore, the suspension insulator of this embodiment is less prone to faults, and the chances for disconnection is lower. Also, as can be seen from FIG. 3, the integral suspension insulator needs only one pair of upper and lower grading rings, and thus the costs of the suspension insulator can be reduced. Moreover, since the integral suspension insulator has an integral structure, it is more convenient to install and remove as compared with existing porcelain suspension insulator or glass suspension insulator.

Since the umbrella string of the suspension insulator is made of silicone rubber and the silicone rubber umbrella string is arranged on the glass fiber-reinforced resin-based composite rod, due to the low density, the weight is reduced greatly, and thus the load of the tower is reduced. Moreover, since the silicone rubber has excellent hydrophobicity and migration of hydrophobicity, the anti-pollution flashover and anti-fog flashover may be improved and the wet flashover voltage and fog flashover voltage are high. Moreover, the suspension insulator is not easy to break, resistant to shooting and easy to transport.

In this embodiment, the structure height is 8020 mm, the minimum arcing distance is 7000 mm. The result is that the minimum nominal creepage distance is 25250 mm, the lightning full-wave impulse withstand voltage (peak) is not lower than 3200 kV, wet operation impulse withstand voltage (peak) is not lower than 2000 kV, the power frequency 1 min wet withstand voltage is not lower than 1300 kV, the rated voltage is 1000 kV, and the rated mechanical load is 530 kN.

Embodiment 2

In Embodiment 2, the structure height is 7910 mm and the minimum arcing distance is 7000 mm. The result is that the minimum nominal creepage distance is 25250 mm, the lightning full-wave impulse withstand voltage is not lower than 3200 kV, the wet operation impulse withstand voltage is not lower than 2000 kV, the power frequency 1 min wet withstand voltage is not lower than 1300 kV, the rated voltage is 1000 kV, and the rated mechanical load is 400 kN.

Embodiment 3

In Embodiment 3, the structure height is 7900 mm and the minimum arcing distance is 7000 mm. The result is that the minimum nominal creepage distance is 25250 mm, the lightning full-wave impulse withstand voltage is not lower than 3200 kV, the wet operation impulse withstand voltage is not lower than 2000 kV, the power frequency 1 min wet withstand voltage is not lower than 1300 kV, the rated voltage is 1000 kV, and the rated mechanical load is 300 kN.

Embodiment 4

In Embodiment 4, the structure height is 7880 mm and the minimum arcing distance is 7000 mm. The result is that the minimum nominal creepage distance is 25250 mm, the lightning full-wave impulse withstand voltage is not lower than 3200 kV, the wet operation impulse withstand voltage is not lower than 2000 kV, the power frequency 1 min wet withstand voltage is not lower than 1300 kV, the rated voltage is 1000 kV, and the rated mechanical load is 210 kN.

A comparison of the dimensions and performances of Embodiments 1-4 is shown in Table 1.

TABLE 1

| Items | rated voltage (kV) | rated mechanical load (kN) | structure height (mm) | minimum arcing distance (mm) | minimum nominal creepage distance (mm) | lightning full-wave impulse withstand voltage (peak) (kV) (not lower than) | wet operation impulse withstand voltage (peak) (kV) (not lower than) | power frequency 1 min wet withstand voltage (kV) (not lower than) |
|---|---|---|---|---|---|---|---|---|
| Embodiment 1 | 1000 | 530 | 8020 | 7000 | 25250 | 3200 | 2000 | 1300 |
| Embodiment 2 | 1000 | 400 | 7910 | 7000 | 25250 | 3200 | 2000 | 1300 |
| Embodiment 3 | 1000 | 300 | 7900 | 7000 | 25250 | 3200 | 2000 | 1300 |
| Embodiment 4 | 1000 | 210 | 7880 | 7000 | 25250 | 3200 | 2000 | 1300 |

As compared with conventional porcelain or glass insulators, the insulator provided by the present disclosure has the following advantages.

1. The porcelain or glass insulators have a large weight, which increases the load of the tower. In contrast, the umbrella string of the present disclosure is made of silicone rubber and is arranged on the fiber-reinforced resin-based composite rod. As compared with porcelain suspension insulator or glass suspension insulator, it has a low density and a light weight, and may reduce the load of the tower and is convenient to install and remove.

2. The porcelain or glass insulators are prone to pollution accumulations and the pollution flashover voltage is low. In contrast, the silicone rubber insulator provided by the present disclosure has excellent hydrophobicity and migration of hydrophobicity, and thus the anti-pollution flashover and anti-fog flashover properties may be improved and the wet flashover voltage and fog flashover voltage are high.

3. The porcelain or glass insulators are fragile, vulnerable to shooting, and inconvenient to transport. In contrast, the silicone rubber insulator of the present disclosure is not easy to break, resistant to shooting, and convenient to transport. The suspension insulator is not prone to break and is easy to transport.

4. The porcelain or glass insulators are prone to disconnection in use. With equivalent quality, for the present disclosure, a fault may only occur at the ends of the silicone rubber umbrella string, while the porcelain insulator or glass insulator with more than 40 pieces have more joints. Therefore, the suspension insulator of the embodiment is less prone to faults, and the chances for disconnection is lower.

Embodiment 5

Figure 4:
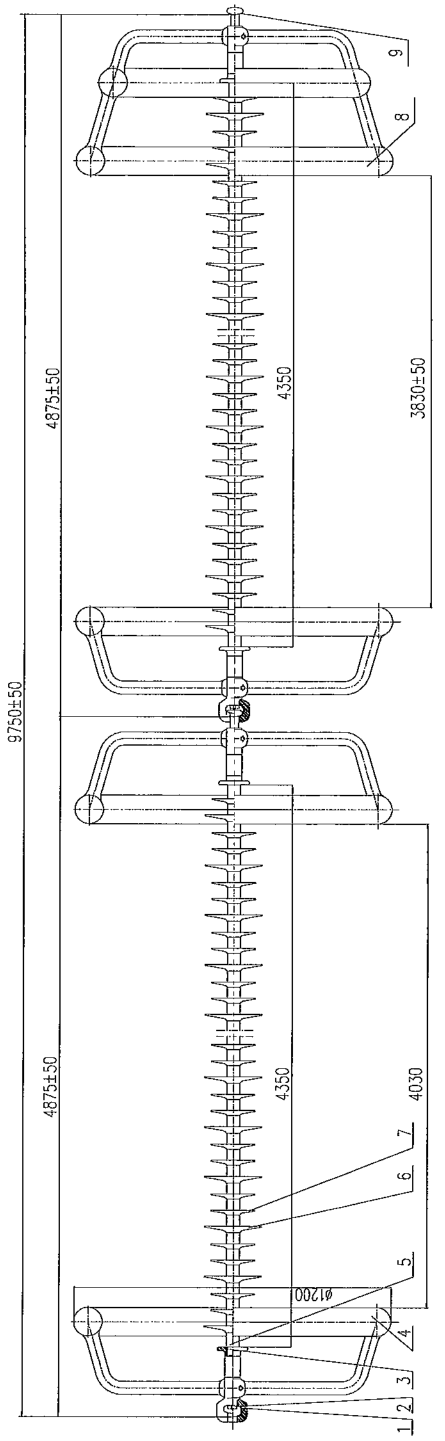
FIG. 4 illustrates the suspension insulator provided by Embodiment 5.

Referring to FIG. 4, in which the unit is mm.

Embodiment 5 has used the same materials as Embodiment 1. In this embodiment, two segments of suspension insulators as shown in Embodiment 1, as sub-suspension insulators, are combined to obtain a new suspension insulator. For example, two sub-suspension insulators may be combined in series as a new suspension insulator as shown in FIG. 4. For example, two sub-suspension insulators may be assembled in the following manner. Firstly, the fastening pin is pulled to a preinstall position, then a head of one sub-suspension insulator is engaged into a socket of another sub-suspension insulator, and then the fastening pin is set to an operation position to fasten the connection between the head and the socket. In this manner, many sub-suspension insulators can be assembled. The length of each sub-suspension insulator is lowered to about 4 m (e.g., 4.35 m), and the new insulator obtained by combining two pieces may have a total length of nearly 10 m. Thus, the silicone rubber umbrella string obtained by combining a number of big umbrellas and small umbrellas is dispersed on two fiber-reinforced resin-based composite rods, to thereby reduce the load of the fiber-reinforced resin-based composite rods. Moreover, as compared with the suspension insulator of Embodiment 1, it is more convenient to produce and transport. Since the suspension insulator of this embodiment has a two-segment structure (i.e., the number of umbrella strings consisting of series of big umbrellas and small umbrellas is two), it can be called a two-segment insulator. Although there are two sub-suspension insulators in this embodiment, in practical applications, the number of sub-suspension insulators is not limited to two, and may be more as needed.

In Embodiment 5, the structure height is 9750 m and the minimum arcing distance is 7860 mm. The result is that the minimum nominal creepage distance is 25250 mm, the lightning full-wave impulse withstand voltage is not lower than 3200 kV, the wet operation impulse withstand voltage is not lower than 2000 kV, the power frequency 1 min wet withstand voltage is not lower than 1300 kV, the rated voltage is 1000 kV, and the rated mechanical load is 530 kN.

Embodiment 6

In Embodiment 6, the structure height is 9750 mm and the minimum arcing distance is 8080 mm. The result is that the minimum nominal creepage distance is 25250 mm, the lightning full-wave impulse withstand voltage is not lower than 3200 kV, the wet operation impulse withstand voltage is not lower than 2000 kV, the power frequency 1 min wet withstand voltage is not lower than 1300 kV, the rated voltage is 1000 kV, and the rated mechanical load is 400 kN.

Embodiment 7

In Embodiment 7, the structure height is 9750 mm and the minimum arcing distance is 8100 mm. The result is that the minimum nominal creepage distance is 25250 mm, the lightning full-wave impulse withstand voltage is not lower than 3200 kV, the wet operation impulse withstand voltage is not lower than 2000 kV, the power frequency 1 min wet withstand voltage is not lower than 1300 kV, the rated voltage is 1000 kV, and the rated mechanical load is 300 kN.

Embodiment 8

In Embodiment 8, the structure height is 9750 mm and the minimum arcing distance is 8150 mm. The result is that the minimum nominal creepage distance is 25250 mm, the lightning full-wave impulse withstand voltage is not lower than 3200 kV, the wet operation impulse withstand voltage is not lower than 2000 kV, the power frequency 1 min wet withstand voltage is not lower than 1300 kV, the rated voltage is 1000 kV, and the rated mechanical load is 210 kN.

A comparison of the dimensions and performances of Embodiments 5-8 is shown in Table 2.

TABLE 2

| Items | rated voltage (kV) | rated mechanical load (kN) | structure height (mm) | minimum arcing distance (mm) | minimum nominal creepage distance (mm) | lightning full-wave impulse withstand voltage (peak) (kV) (not lower than) | wet operation impulse withstand voltage (peak) (kV) (not lower than) | power frequency 1 min wet withstand voltage (kV) (not lower than) |
|---|---|---|---|---|---|---|---|---|
| Embodiment 5 | 1000 | 530 | 9750 | 7860 | 25250 | 3200 | 2000 | 1300 |
| Embodiment 6 | 1000 | 400 | 9750 | 8080 | 25250 | 3200 | 2000 | 1300 |
| Embodiment 7 | 1000 | 300 | 9750 | 8100 | 25250 | 3200 | 2000 | 1300 |
| Embodiment 8 | 1000 | 210 | 9750 | 8150 | 25250 | 3200 | 2000 | 1300 |

Moreover, the big umbrellas and small umbrellas of the silicone rubber umbrella string in the above embodiments may also employ other regular serial arrangements of big umbrellas and small umbrellas. For example, two big umbrellas and two small umbrellas are alternately connected in series, or three big umbrellas and three small umbrellas are alternately arranged, or one big umbrella and one small umbrella are alternately arranged, or the like. Various arrangements of big umbrellas and small umbrellas can implement the embodiments of the present disclosure. Preferably, the arrangement as shown in Embodiment 1 (i.e., one big umbrella and two small umbrellas are alternately arranged in series), or the arrangement in which two big umbrellas and two small umbrellas are alternately arranged in series, is used. These two regular arrangements make the force evenly distributed.

According to the suspension insulator provided by the present disclosure, since the umbrella string is made of silicone rubber and is arranged on the fiber-reinforced resin-based composite rod, as compared with porcelain suspension insulator or glass suspension insulator, it has a low density and a light weight, and may reduce the load of the tower and is convenient to install and remove.

The suspension insulator provided by the present disclosure is especially applicable to the field of power transmission.

The above are preferred embodiments of the present disclosure. It should be noted that, those skilled in the art can make various improvements and modifications without departing from the principle of the present disclosure.

The invention claimed is:

1. A suspension insulator, comprising a silicone rubber umbrella string and a fiber-reinforced resin-based composite rod, wherein the silicone rubber umbrella string is arranged on the fiber-reinforced resin-based composite rod;

wherein the fiber-reinforced resin-based composite rod includes a core layer and an outer layer; and wherein the core layer is made of fiber-reinforced resin-based composite, and the outer layer is made of silicone rubber.

2. The suspension insulator according to claim 1, characterized in that the host silicone rubber material used for preparing the silicone rubber is one selected from the following materials: methyl vinyl silicone rubber, dimethyl silicone rubber, methyl phenyl vinyl silicone rubber, fluorocarbon silicone rubber, nitrile silicone rubber, phenylene and phenylene oxide silicone rubber.

3. The suspension insulator according to claim 1, characterized in that the fiber is selected from the following materials: glass fibers, organic polyamide fibers, aramid fibers and carbon fibers.

4. The suspension insulator according to claim 1, characterized in that the resin is selected from the following materials: epoxy resin, unsaturated polyester resin and toughened epoxy resin.

5. The suspension insulator according to claim 1, characterized in that the fiber-reinforced resin-based composite is glass fiber-reinforced epoxy resin-based composite.

6. The suspension insulator according to claim 1, characterized in that the materials used for preparing the silicone rubber comprise: methyl vinyl silicone rubber, white carbon black, aluminum hydroxide micropowder and iron oxide red in weight percents of 43%, 20%, 30% and 7% respectively.

7. The suspension insulator according to claim 2, characterized in that the methyl vinyl silicone rubber has a molecular weight of $3\text{-}7\times10^5$.

8. The suspension insulator according to claim 1, characterized in that the silicone rubber umbrella string has a length of 4 meters or above.

9. A suspension insulator group, comprising two or more suspension insulators of claim 1, connected in series.

10. A suspension insulator, comprising a silicone rubber umbrella string and a fiber-reinforced resin-based composite rod, wherein the silicone rubber umbrella string is arranged on the fiber-reinforced resin-based composite rod;

wherein the silicone rubber umbrella string comprises big umbrellas and small umbrellas; and wherein the big umbrellas and the small umbrellas have an umbrella center of a larger size than an umbrella edge.

11. The suspension insulator according to claim 10, characterized in that the big umbrellas and the small umbrellas are arranged in series.

12. The suspension insulator according to claim 11, characterized in that the big umbrellas and the small umbrellas are arranged in series regularly.

13. The suspension insulator according to claim 12, characterized in that two big umbrellas and two small umbrellas are arranged alternately in series, or one big umbrella and two small umbrellas are arranged alternately in series.

14. A suspension insulator, comprising a silicone rubber umbrella string and a fiber-reinforced resin-based composite rod, wherein the silicone rubber umbrella string is arranged on the fiber-reinforced resin-based composite rod; and wherein the suspension insulator further comprises an upper grading ring and a lower grading ring, wherein one side of the upper grading ring and one side of the lower grading ring are connected to the ends of the silicone rubber umbrella string, respectively.

15. The suspension insulator according to claim 14, characterized in that the suspension insulator further comprises a head and a socket, the other side of one of the upper grading ring and the lower grading ring is connected to the head, while the other side of the other of the upper grading ring and the lower grading ring is connected to the socket.

16. The suspension insulator according to claim 15, characterized in that the suspension insulator further comprises a fastening pin, wherein the fastening pin is placed in the socket to fasten the connection between the head and the socket.

17. The suspension insulator according to claim 14, characterized in that the upper grading ring and the lower grading ring have a shape of a circular ring.

18. The suspension insulator according to claim 14, characterized in that the upper grading ring and the lower grading ring have a diameter of 1 meter or above.

* * * * *

UNITED STATES PATENT AND TRADEMARK OFFICE

CERTIFICATE OF CORRECTION

PATENT NO. : 8,912,437 B2
APPLICATION NO. : 13/391330
DATED : December 16, 2014
INVENTOR(S) : Guoli Teng It is certified that error appears in the above-identified patent and that said Letters Patent is hereby corrected as shown below:

In the Claims

Column 9, Line 66, Claim 2, delete “is one” and insert -- is --

Signed and Sealed this
Fourteenth Day of April, 2015

Michelle K. Lee

Michelle K. Lee
*Director of the United States Patent and Trademark Office*